(12) United States Patent
Jia et al.

(10) Patent No.: US 12,223,852 B2
(45) Date of Patent: Feb. 11, 2025

(54) REMOTE COLLABORATION BETWEEN USERS UTILIZING AT LEAST ONE OF AUGMENTED REALITY AND VIRTUAL REALITY COMPUTING DEVICES

(71) Applicant: Dell Products L.P., Round Rock, TX (US)

(72) Inventors: Zhen Jia, Shanghai (CN); Danqing Sha, Shanghai (CN); Bin He, Shanghai (CN); Victor Fong, Melrose, MA (US); Anzhou Hou, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 497 days.

(21) Appl. No.: 17/691,817

(22) Filed: Mar. 10, 2022

(65) Prior Publication Data
US 2023/0290266 A1    Sep. 14, 2023

(51) Int. Cl.
G09B 19/00    (2006.01)
G06T 19/00    (2011.01)
(Continued)

(52) U.S. Cl.
CPC ........ *G09B 19/0053* (2013.01); *G06T 19/006* (2013.01); *G06V 20/20* (2022.01); *H04N 23/698* (2023.01)

(58) Field of Classification Search
CPC ............. G09B 19/0053; G06T 19/006; G06T 2219/024; G06T 19/00; G06V 20/20;
(Continued)

(56) References Cited

U.S. PATENT DOCUMENTS

2018/0332441 A1* 11/2018 Shaw .................... H04L 63/105
2020/0042263 A1*  2/2020 Iyer ....................... G06F 3/1454
(Continued)

OTHER PUBLICATIONS

The Linux Foundation, "EdgeX," https://www.edgexfoundry.org/, Accessed Mar. 3, 2022, 21 pages.
(Continued)

*Primary Examiner* — Michael A Keller
*Assistant Examiner* — Chhian (Amy) Ling
(74) *Attorney, Agent, or Firm* — Ryan, Mason & Lewis, LLP

(57) ABSTRACT

An apparatus comprises at least one processing device configured to establish, utilizing a communication network, a remote collaboration session between first and second computing devices associated with first and second users, and to determine data to be exchanged between the first and second computing devices as part of the remote collaboration session. The first and second computing devices each comprise at least one of an augmented reality and a virtual reality computing device. The processing device is also configured to generate different logical network slices of the communication network, each logical network slice having a set of network characteristics associated with at least one type of the data to be exchanged between the first and second computing devices as part of the remote collaboration session. The processing device is further configured to communicate the different types of data between the first and second computing devices utilizing the logical network slices.

20 Claims, 9 Drawing Sheets

(51) Int. Cl.
G06V 20/20 (2022.01)
H04N 23/698 (2023.01)
(58) Field of Classification Search
CPC .............. H04N 23/698; H04L 65/1069; H04L 65/4015; H04L 65/612; H04L 65/80
See application file for complete search history.

(56) References Cited

U.S. PATENT DOCUMENTS

| | | | | |
|---|---|---|---|---|
| 2023/0123074 A1* | 4/2023 | Ahmed | ................. | H04W 24/02 370/252 |
| 2023/0258466 A1* | 8/2023 | Lee | .................... | G01C 21/3476 701/426 |
| 2024/0080759 A1* | 3/2024 | Gupta | ................... | H04L 47/781 |

OTHER PUBLICATIONS

Dell Inc., "OptiPlex 7050 Tower, Small Form Factor and Micro," Technical Specifications, Feb. 2017, 4 pages.
A. Viviano, "Overview of Single Root I/O Virtualization (SR-IOV)" https://docs.microsoft.com/en-us/windows-hardware/drivers/network/single-root-i-o-virtualization--sr-iov-, Dec. 14, 2021, 2 pages.
Dell Technologies, "PowerEdge R440," Spec Sheet, Mar. 24, 2021, 2 pages.
Dell Technologies, "PowerEdge R640," Spec Sheet, Aug. 9, 2019, 2 pages.
Tigera, Inc., "What is Project Calico?" https://www.tigera.io/project-calico/, Accessed Mar. 3, 2022, 6 pages.
Microsoft, "Dynamics 365 Remote Assist," https://dynamics.microsoft.com/en-us/mixed-reality/remote-assist/, Accessed Mar. 3, 2022, 9 pages.
Spatial Systems, Inc. "Explore the Metaverse," https://spatial.io/, Accessed Mar. 3, 2022, 5 pages.
PTC Products, "Vuforia Chalk: Remote Assistance Powered by Augmented Reality," https://www.ptc.com/en/products/vuforia/vuforia-chalk, Accessed Mar. 3, 2022, 8 pages.
Dell Technologies, "Dell EMC VxRail," Solution Brief, 2021, 2 pages.
Insta360, "The World's Smallest Action Camera," https://www.insta360.com/product/insta360-go2/, Accessed Mar. 3, 2022, 19 pages.
Go Pro, Inc., "Fusion User Manual," https://gopro.com/content/dam/help/fusion/manuals/Fusion_UM_ENG_REVC.pdf, May 2018, 37 pages.
Ricoh Company, Ltd. "THETA V," https://theta360.com/en/about/theta/v.html, Accessed Jan. 3, 2022, 13 pages.
Garmin Ltd., "VIRB 360," https://www.garmin.com/en-us/p/562010, Accessed Jan. 3, 2022, 8 pages.
D. Dougherty, "Autopano Pro/Giga," https://veer.tv/blog/kolor-autopano-create-a-panorama-with-autopano-progiga/, May 17, 2018, 5 pages.
New House Internet Services BV, "PTGui," https://www.ptgui.com/, Accessed Jan. 3, 2022, 8 pages.
Adobe, "Create and Edit Panoramic Images," https://helpx.adobe.com/photoshop/using/create-panoramic-images-photomerge.html, Nov. 16, 2021, 11 pages.
Unity, "The Platform of Choice for Multiplayer Hits," https://unity.com/, Accessed Jan. 3, 2022, 13 pages.
Epic Games, Inc. "Unreal Engine," https://www.unrealengine.com/en-us/, Accessed Jan. 3, 2022, 10 pages.
OSVR, "Developer Portal," https://osvr.github.io/, Accessed Jan. 3, 2022, 2 pages.
janusxr.org, "JanusXR—The Immersive Internet," https://janusvr.com/, Accessed Jan. 3, 2022, 3 pages.
OpenSpace3D, "OpenSpace3D Documentation," https://www.openspace3d.com/documentation/en/, Accessed Mar. 3, 2022, 2 pages.
Amazon Web Services, "Amazon Sumerian," https://aws.amazon.com/sumerian/, Accessed Mar. 3, 2022, 9 pages.
Crytek GMBH, "CryEngine," https://www.cryengine.com/, Accessed Jan. 3, 2022, 9 pages.
Blender Foundation, "The Blender Project," https://www.blender.org/, Accessed Jan. 3, 2022, 15 pages.
AutoDesk Inc. "3ds Max," https://www.autodesk.com/products/3ds-max/overview?support=ADVANCED&plc=3DSMAX&term=1-YEAR&quantity=1&tab=subscription, Accessed Jan. 3, 2022, 13 pages.
Trimble Inc. "SketchUp Studio," https://www.sketchup.com/plans-and-pricing/sketchup-studio, Accessed Jan. 3, 2022, 13 pages.
AutoDesk Inc. "Maya," https://www.autodesk.com/products/maya/overview?support=ADVANCED&term=1-YEAR&tab=subscription, Accessed Jan. 3, 2022, 9 pages.
Engage, "Real Business Done Virtually," https://engagevr.io/, Accessed Mar. 3, 2022, 3 pages.
Microsoft Inc. "AltspaceVR," https://altvr.com/, Accessed Jan. 3, 2022, 5 pages.
Acadicus, "Virtual Simulation Center," https://acadicus.com/, Accessed Jan. 3, 2022, 16 pages.
DogHead Simulations, "Why Rumii?" https://www.dogheadsimulations.com/rumii, Accessed Jan. 3, 2022, 7 pages.
Future Visual, "VisionxR," https://www.futurevisual.com/visionxr/, Accessed Mar. 3, 2022, 8 pages.
Immersed Inc., "Work Faster in VR Than in Real Life," https://immersed.com/, Accessed Jan. 3, 2022, 6 pages.
Mozilla, "System Overview," https://hubs.mozilla.com/docs/system-overview.html, Accessed Jan. 3, 2022, 3 pages.
Glue Collaboration 2021, "Glue Platform," https://glue.work/glue-platform/, Accessed Jan. 3, 2022, 10 pages.
CONNEC2 B.V. "XR as a Service," https://www.connec2.nl/, Accessed Mar. 3, 2022, 8 pages.
MeetInVR, "Business Meeting & Collaboration in VR," https://www.meetinvr.com/, Accessed Jan. 3, 2022, 7 pages.
R. Arutperunjothi et al., "Akraino Edge Stack," https://wiki.akraino.org/display/AK/Akraino+Edge+Stack, Aug. 7, 2020, 4 pages.
P. Judge, "ABB Offers Augmented Reality for Remote Support," https://www.datacenterdynamics.com/en/news/abb-offers-augmented-reality-for-remote-support/, Sep. 2, 2021, 5 pages.
Red Hat Inc., "About the OVN-Kubernetes Default Container Network Interface (CNI) Network Provider," https://docs.openshift.com/container-platform/4.6/networking/ovn_kubernetes_network_provider/about-ovn-kubernetes.html, Accessed Mar. 3, 2022, 4 pages.
W. Ying, "IEC Type 4 Blueprint: AR/VR at Edge," https://wiki.akraino.org/download/attachments/6129521/Akraino_Blueprint_Family_IEC%20Type%204%20BP%20v9.pdf, Jun. 2019, 8 pages.
Ericsson Group, "Telia, Intel and Ericsson Demonstrate Augmented Reality over a Live 5G Network," https://ericsson.com/en/news/2018/3/5g-augmented-reality, Accessed Mar. 3, 2022, 4 pages.
X. Hu, "Containerized Compass for K8S Integration," https://wiki.opnfv.org/display/compass4nfv/Containerized+Compass+for+K8S+Integration, Feb. 16, 2018, 10 pages.
contivpp.io, "Contiv-VPP," https://contivpp.io/, Accessed Mar. 3, 2022, 3 pages.
VMWare Inc., "Data Plane Acceleration using DPDK," https://docs.vmware.com/en/VMware-Telco-Cloud-Platform---5G-Edition/2.0/telco-cloud-platform-5g-edition-data-plane-performance-tuning-guide/GUID-E4BF8181-C2FF-43FE-8D25-848996C8D55C.html, May 20, 2021, 3 pages.
E. Rocchetti, "Taking Datacenter Operations to the Next Step of Digitization with Augmented Reality," https://www.ericsson.com/en/blog/2019/2/datacenter-operations-with-augmented-reality, Feb. 19, 2019, 5 pages.
Mural "Use Mural's Digital Whiteboard to Erase Boring, Unproductive Meetings from Your Calendar," https://start.mural.co/digital-whiteboard, Accessed Mar. 3, 2022, 2 pages.
S. R. Addepalli, "Orchestration for Edge-Computing (WIP)—Background Work to Identify Gaps," https://wiki.onap.org/download/attachments/28379482/Edge_ONAP_WG_v7.pdf?api=v2, Sep. 2018, 36 pages.
S. Thorson, "Welcome to a World of Immersive Experiences with XR," https://www.ericsson.com/en/blog/2021/11/welcome-to-xr-immersive-experiences, Nov. 30, 2021, 9 pages.

(56) References Cited

OTHER PUBLICATIONS

Nvidia, "Developing a Linux Kernel Module using RDMA for GPUDirect," Application Guide, v11.6, Jan. 2022, 31 pages.
Dell Technologies, "Dell EMC VxRail," Spec Sheet, 2021, 8 pages.
Arvizio, Inc., "Augmented and Mixed Reality for the Enterprise," https://www.arvizio.io/, Accessed Mar. 3, 2022, 7 pages.
The Linux Foundation, "IEC Type 4 AR/VR," https://www.lfedge.org/release-2/, Accessed Mar. 3, 2022, 3 pages.
The Knative Authors, "Knative is an Open-Source Enterprise-level Solution to Build Serverless and Event Driven Applications," https://knative.dev/docs/, Accessed Mar. 3, 2022, 5 pages.
B. Ethirajulu, "How 5G and Edge Computing Can Enhance Virtual Reality," https://www.ericsson.com/en/blog/2020/4/how-5g-and-edge-computing-can-enhance-virtual-reality, Apr. 8, 2020, 7 pages.
IMVU, "Where Real Life Comes to Play," https://about.imvu.com/, Accessed Mar. 3, 2022, 8 pages.
The Kubeflow Authors, "Kubeflow," https://www.kubeflow.org/, Accessed Mar. 3, 2022, 2 pages.
The Kubernetes Authors, "Kubernetes Documentation," Feb. 20, 2022, 2 pages.
XConnect, "HLR Lookup and MNP Data," https://www.xconnect.net/, Accessed Mar. 3, 2022, 6 pages.

* cited by examiner

REMOTE COLLABORATION BETWEEN USERS UTILIZING AT LEAST ONE OF AUGMENTED REALITY AND VIRTUAL REALITY COMPUTING DEVICES

FIELD

The field relates generally to information processing, and more particularly to management of information processing systems.

BACKGROUND

Data centers and other facilities housing information technology (IT) infrastructure can be very large and difficult to navigate and service. A data center may include various different types of IT assets. The IT assets may include numerous different types of computing, networking and storage hardware and software that needs to be installed, configured, maintained and otherwise provisioned by support technicians. The support technicians may include on-site support technicians or field engineers, as well as remote support technicians or engineers that communicate with the on-site support technicians or field engineers to provide assistance in various provisioning tasks for the IT assets. There is a need for improved remote collaboration between such on-site support technicians or field engineers and the remote support technicians or engineers.

SUMMARY

Illustrative embodiments of the present disclosure provide techniques for remote collaboration between users utilizing at least one of augmented reality and virtual reality computing devices.

In one embodiment, an apparatus comprises at least one processing device comprising a processor coupled to a memory. The at least one processing device is configured to perform the step of establishing, utilizing one or more communication networks, a remote collaboration session between at least a first computing device associated with a first user at a first location and at least a second computing device associated with a second user at a second location different than the first location, wherein each of the first computing device and the second computing device comprises at least one of an augmented reality computing device and a virtual reality computing device. The at least one processing device is also configured to perform the steps of determining two or more different types of data to be exchanged between the first computing device and the second computing device as part of the remote collaboration session, and generating two or more different logical network slices of the one or more communication networks, each of the two or more different logical network slices of the one or more communication networks having a set of network characteristics associated with at least a given one of the two or more different types of data to be exchanged between the first computing device and the second computing device as part of the remote collaboration session. The at least one processing device is further configured to perform the step of communicating the two or more different types of data between the first computing device and the second computing device utilizing the two or more different logical network slices of the one or more communication networks.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
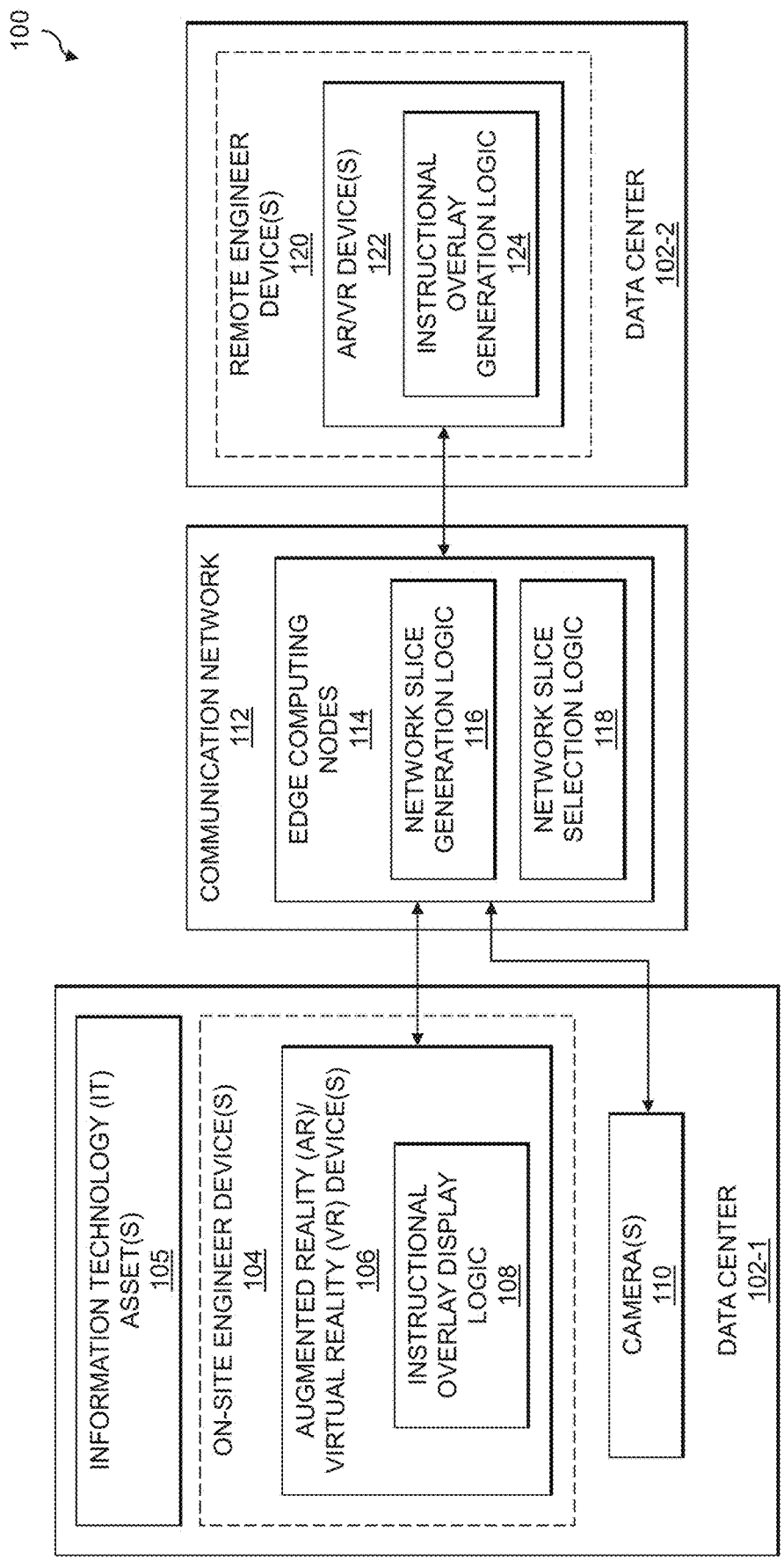
FIG. 1 is a block diagram of an information processing system configured for remote collaboration between users utilizing at least one of augmented reality and virtual reality computing devices in an illustrative embodiment.

FIG. 1 shows an information processing system 100 configured in accordance with an illustrative embodiment for remote collaboration between users utilizing at least one of augmented reality (AR) and virtual reality (VR) computing devices. The information processing system 100 comprises first and second data centers 102-1 and 102-2, which are assumed to be at first and second different locations (e.g., the second data center 102-2 is remote from the first data center 102-1). The data center 102-1 includes a set of information technology (IT) assets 105. The IT assets 105 may include physical and virtual computing resources. Physical computing resources may include physical hardware such as servers, storage systems, networking equipment, Internet of Things (IoT) devices, satellite devices, other types of processing and computing devices, etc. Virtual computing resources may include virtual machines (VMs), software containers (also referred to herein as containers), etc. An on-site engineer that is physically present at the data center 102-1 is assumed to perform one or more provisioning actions on one or more of the IT assets 105. Such provisioning actions may include, but are not limited to, installation and/or removal of ones of the IT assets 105, configuration of one or more of the IT assets 105, maintenance of one or more of the IT assets 105, troubleshooting one or more issues encountered on one or more of the IT assets 105, etc.

The on-site engineer utilizes one or more on-site engineer devices 104, which are assumed to include one or more AR and/or VR devices 106 (collectively, AR/VR devices 106). The AR/VR devices 106 may include one or more glasses, lens or other types of AR devices. The AR/VR devices 106 may also or alternatively include one or more head-mounted displays (HMDs), processing devices with web browsers or other applications configured for generation and display of VR computing environments, other types of VR devices, etc. It should further be appreciated that a single device may provide both AR and VR functionality (e.g., the ability to generate or provide both AR and VR computing environments). The term "AR/VR device(s)" as used herein is thus intended to be broadly construed to include devices that provide functionality of an AR computing environment, a VR computing environment, or both AR and VR computing environments. The AR/VR devices 106 are used to provide instructions to the on-site engineer to facilitate the one or more provisioning actions performed on one or more of the IT assets 105. The instructions are output for display on the AR/VR devices 106 associated with the on-site engineer utilizing instructional overlay display logic 108.

The data center 102-1 further includes one or more cameras 110, which are assumed to provide images and/or video feeds of the data center 102-1 (e.g., including the IT assets 105 thereof). In some embodiments, the cameras 110 comprise 360 degree (°) panoramic cameras configured to generate 360° panoramic views of the data center 102-1 or at least a portion of the IT assets 105 thereof. In other embodiments, the cameras 110 may include non-360° panoramic cameras providing images and/or video feeds that can be stitched together to generate 360° panoramic views of the data center 102-1 or at least a portion of the IT assets 105 thereof.

To facilitate the provisioning actions performed on the one or more IT assets 105 by the on-site engineer, information from the AR/VR devices 106 and cameras 110 may be provided to a remote engineer at the data center 102-2. In some embodiments, the information from the AR/VR devices 106 are communicated via other ones of the on-site engineer devices 104. The remote engineer utilizes one or more remote engineer devices 120, which are assumed to include one or more AR and/or VR devices 122 (collectively, AR/VR devices 122). The AR/VR devices 122, similar to the AR/VR devices 106, may include one or more glasses, lens or other types of AR devices. The AR/VR devices 122 may also or alternatively include one or more HMDs, processing devices with web browsers or other applications configured for generation and display of VR computing environments, or other types of VR devices. In some embodiments, the on-site engineer's AR/VR devices 106 include an AR device while the remote engineer's AR/VR devices 122 include a VR device. It should be appreciated, however, that in other embodiments the on-site and remote engineer may both utilize AR devices, the on-site and remote engineer may both utilize VR devices, or one or both of the on-site and the remote engineer may utilize both AR and VR devices.

The AR/VR devices 122 are configured to display information from the AR/VR devices 106 and the cameras 110, so that the remote engineer at the data center 102-2 can "see" what the on-site engineer sees at the data center 102-1. The remote engineer can interact with the AR and/or VR computing environment generated by the AR/VR devices 122, and utilize instructional overlay generation logic 124 to generate instructional overlays to be displayed on the AR/VR devices 106 associated with the on-site engineer at the data center 102-1. Such generated instructional overlays may be communicated directly from the AR/VR devices 122 to the communication networks 112, or via other ones of the remote engineer devices 120. In this way, the remote engineer can assist the on-site engineer with the one or more provisioning actions to be performed on one or more of the IT assets 105.

The on-site engineer and the remote engineer may be different users that are associated with one or more enterprises. For example, the on-site engineer and the remote engineer may be support technicians that are employed by an enterprise to fulfill support services for the IT assets 105 deployed at the data center 102-1. In other embodiments, the on-site engineer and the remote engineer may be associated with different enterprises. For example, the on-site engineer may be part of a first enterprise system that operates the data center 102-1 and the IT assets 105 thereof, while the remote engineer is part of a second enterprise system that provides support services to the first enterprise system. The term "user" herein is intended to be broadly construed so as to encompass numerous arrangements of human, hardware, software or firmware entities, as well as combinations of such entities.

The data centers 102-1 and 102-2 are coupled via at least one communication network 112 which includes one or more edge computing nodes 114. Data (e.g., live image and/or video feeds) from the AR/VR devices 106 associated with the on-site engineer, as well as data (e.g., live image and/or video feeds) from the cameras 110 are provided to the edge computing nodes 114 of the communication network 112. The edge computing nodes 114 are configured to utilize network slice generation logic 116 and network slice selection logic 118 to create logical or virtual networks for communication of different portions of the data from the AR/VR devices 106 and cameras 110 to the remote engineer devices 120 at the data center 102-2. In some embodiments, two or more network slices are generated, and data is transmitted over different ones of the two or more generated network slices to facilitate latency and other requirements for AR and VR computing environments. Similarly, instruction overlay information communicated between the AR/VR devices 106 and the AR/VR devices 122 may be passed via the communication network 112 over different ones of the two or more network slices in accordance with requirements for the AR and VR computing environments.

At least portions of the functionality of the instructional overlay display logic 108, the network slice generation logic 116, the network slice selection logic 118 and the instructional overlay generation logic 124 may be implemented at least in part in the form of software that is stored in memory and executed by a processor.

The IT assets 105 of the data center 102-1 may be configured to provide compute and/or storage services for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The IT assets 105, on-site engineer devices 104, AR/VR devices 106, cameras 110, edge computing nodes 114, remote engineer devices 120 and AR/VR devices 122 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The IT assets 105, on-site engineer devices 104, AR/VR devices 106, cameras 110, edge computing nodes 114, remote engineer devices 120, and AR/VR devices 122 (or one or more components thereof such as the instructional overlay display logic 108, the network slice generation logic 116, the network slice selection logic 118 and the instructional overlay generation logic 124) may be implemented on respective distinct processing platforms, although numerous other arrangements are possible.

The communication network 112 may be implemented using multiple networks of different types. For example, the communication network 112 may comprise a portion of a global computer network such as the Internet, although other types of networks can be part of the communication network 112 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The communication network 112 in some embodiments therefore comprises combinations of multiple different types of networks each comprising processing devices configured to communicate using Internet Protocol (IP) or other related communication protocols. In some embodiments, it is assumed that the communication network 112 comprises a 5G communication network that provides network slicing functionality as described elsewhere herein.

The IT assets 105, on-site engineer devices 104, AR/VR devices 106, cameras 110, edge computing nodes 114, remote engineer devices 120 and AR/VR devices 122 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks including communication network 112.

The term "processing platform" as used herein is intended to be broadly construed so as to encompass, by way of illustration and without limitation, multiple sets of processing devices and one or more associated storage systems that are configured to communicate over one or more networks. For example, distributed implementations of the data centers 102 are possible, in which the data center 102-1 resides in a first geographic location while the data center 102-2 reside in at least a second geographic location that is potentially remote from the first geographic location. Numerous other distributed implementations of the system 100 are possible.

Additional examples of processing platforms utilized to implement portions of the system 100 in illustrative embodiments will be described in more detail below in conjunction with FIGS. 8 and 9.

It is to be understood that the particular set of elements shown in FIG. 1 for remote collaboration between users utilizing at least one of AR and VR computing devices is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
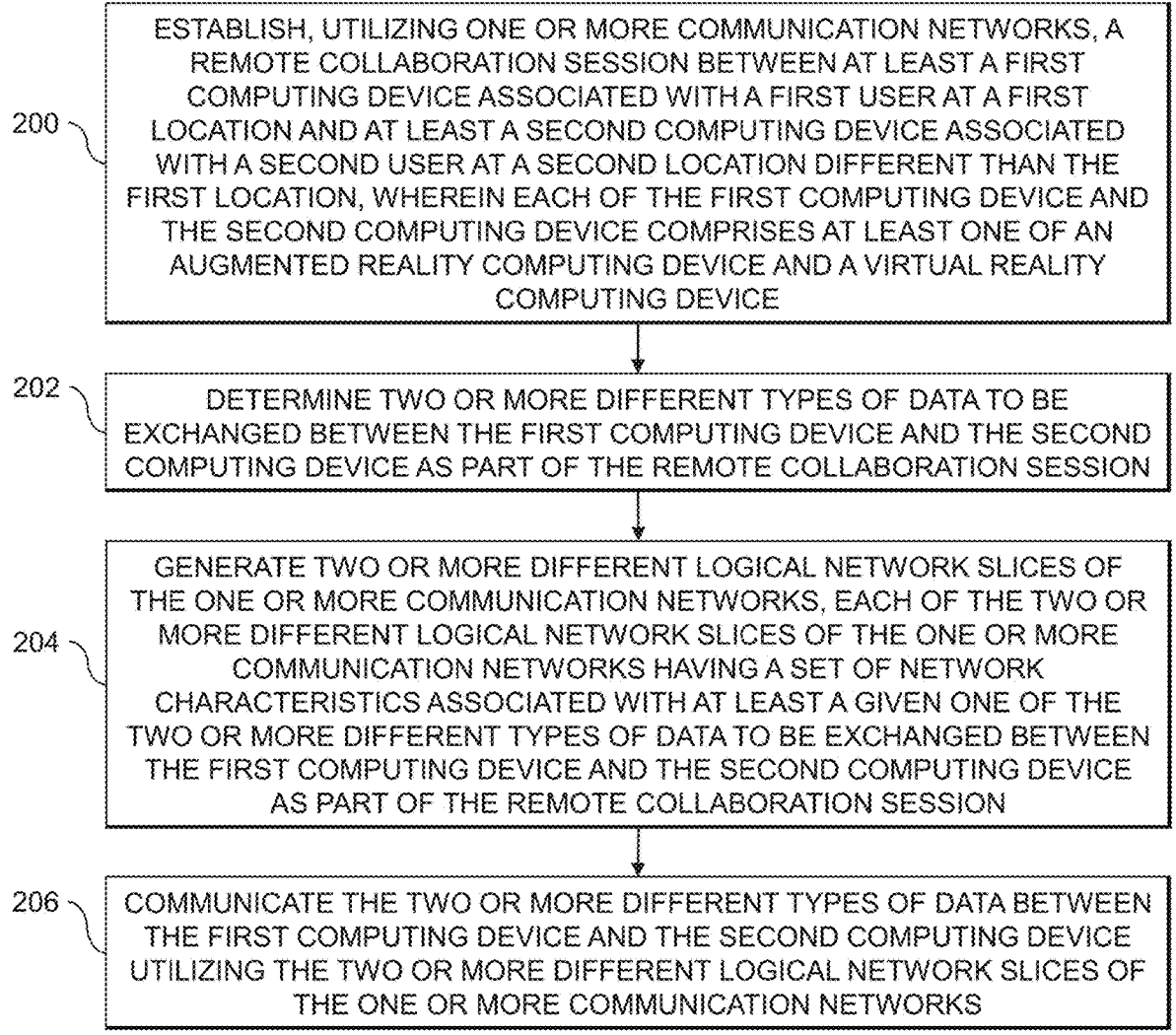
FIG. 2 is a flow diagram of an exemplary process for remote collaboration between users utilizing at least one of augmented reality and virtual reality computing devices in an illustrative embodiment.

An exemplary process for remote collaboration between users utilizing at least one of AR and VR computing devices will now be described in more detail with reference to the flow diagram of FIG. 2. It is to be understood that this particular process is only an example, and that additional or alternative processes for remote collaboration between users utilizing at least one of AR and VR computing devices may be carried out in other embodiments.

In this embodiment, the process includes steps 200 through 206. These steps are assumed to be performed by the AR/VR devices 106, the edge computing nodes 114 and the AR/VR devices 122 utilizing the instructional overlay display logic 108, the network slice generation logic 116, the network slice selection logic 118 and the instructional overlay generation logic 124. The process begins with step 200, establishing, utilizing one or more communication networks (e.g., 112), a remote collaboration session between at least a first computing device (e.g., 104, 106) associated with a first user at a first location (e.g., 102-1) and at least a second computing device (e.g., 120, 122) associated with at least a second user at a second location (e.g., 102-2) different than the first location. The one or more communication networks may comprise a 5G communication network. Each of the first and second computing devices comprises at least one of an AR device and a VR device. The first user may be associated with a first enterprise operating a data center at the first location, and the second user may be associated with a second enterprise providing support services to the first enterprise.

In step 202, two or more different types of data to be exchanged between the first and second computing devices as part of the remote collaboration session are determined. Two or more different logical network slices of the one or more communication networks are generated in step 204. Each of the two or more different logical network slices of the one or more communication networks has a set of network characteristics associated with at least a given one of the two or more different types of data to be exchanged between the first and second computing devices as part of the remote collaboration session. The two or more different types of data are communicated between the first and second computing devices in step 206 utilizing the two or more different logical network slices of the one or more communication networks.

The two or more different types of data to be exchanged between the first and second computing devices as part of the remote collaboration session may comprise two or more live video streams and digital guidance for one or more provisioning actions to be performed on one or more IT assets (e.g., 105) at the first location. The digital guidance for the one or more provisioning actions to be performed on the one or more IT assets at the first location may comprise at least one audio stream for audio communications between the first user and the second user. The digital guidance for the one or more provisioning actions to be performed on the one or more IT assets at the first location may also or alternatively comprise one or more annotations for digital overlay via the first computing device (e.g., via an AR device). The two or more live video streams may comprise a first live video stream from the first computing device and at least a second live video stream from one or more video cameras (e.g., 110) at the first location. The first live video stream may further comprise inertial measurement unit data from at least one AR computing device. The second live video stream may comprise a 360° panoramic view of the one or more IT assets at the first location from one or more 360° panoramic video cameras at the first location. The second live video stream may alternatively comprise a 360° panoramic view of the one or more IT assets at the first location that is stitched together from two or more non-360° panoramic video cameras at the first location.

The two or more different logical network slices may comprise at least a first logical network slice for the two or more live video streams, and at least a second logical network slice for the digital guidance for the one or more provisioning actions to be performed on the one or more IT assets at the first location. The first set of network characteristics of the first logical network slice may comprise a first data throughput level and a first latency and the second set of network characteristics of the second logical network slice may comprise a second data throughput level and a second latency. The second data throughput level may be lower than the first data throughput level, and the second latency may be lower than the first latency.

In some embodiments, at least one of the two or more different types of data to be exchanged between the first and second computing devices as part of the remote collaboration session may be preprocessed utilizing one or more edge computing nodes (e.g., 114) of the one or more communication networks. Such preprocessing may include, for example, pose estimation of the first user, object tracking of one or more of the IT assets at the first location, and object recognition of the one or more IT assets at the first location.

Illustrative embodiments provide tools which enable AR and/or VR based guidance for installation and remote collaboration in IT infrastructure. Such remote collaboration is facilitated by leveraging edge computing and 5G communication networks to offload compute-intensive resources. Some embodiments are thus well aligned with trends in the IT industry such as the adoption and development of the "metaverse."

In some embodiments, a first user (e.g., an on-site engineer in a data center) wears one or more headsets, glasses or other types of AR devices. Digital instructional overlays are provided to the first user via such AR devices. The digital instructional overlays may include, by way of example, interactive training modules which take the first user through a series of visual work prompts or step-by-step instructions guiding the first user to perform installation, configuration, maintenance, troubleshooting and other provisioning tasks for IT assets in an IT infrastructure. The data center where the first user is located may have one or more 360° cameras installed therein, configured to provide real-time panoramic video streaming which can be provided to one or more additional users that are remotely located. Such additional users (e.g., remote engineers) can utilize the web and smart devices (e.g., VR devices configured to provide access to a VR computing environment) to see what the first user (e.g., the on-site or field engineer) sees, and for providing a live feedback loop for guided support (e.g., graphical annotations, voice assistance, etc.) in AR and/or VR computing environments.

The tools described herein can be connected to multiple computers or smart devices (e.g., associated with multiple additional users), enabling shared work and collaboration between the first user and such additional users across multiple different devices. At the "terminal" side where the first user is located, it is assumed that one or more AR devices (e.g., AR glass or AR lens devices) are used by the first user. At the "remote" side where the additional users are located, it is assumed that one or more VR devices (e.g., HMDs, web browsers, etc.) are used by the additional users. It should be appreciated, however, that the first user may utilize one or more VR devices in addition to or in place of one or more AR devices. Similarly, the additional users may utilize one or more AR devices in addition to or in place of one or more VR devices. As discussed above, in some cases a single device may provide functionality for generating both AR and VR computing environments, and thus may be characterized as a hybrid or combined AR and VR computing device. In some embodiments, the AR/VR devices used by the first user are set up as "thin client" devices with a minimum set of capabilities that need to be present for rendering the AR/VR experience for the first user. Computation-intensive components, such as pose estimation, trackers, mappers, object recognizers, etc., are offloaded to remote sites (e.g., edge computing sites, cloud computing platforms, other data centers, etc.). 5G edge computing and network slicing technologies are leveraged in some embodiments to enhance transmission quality of audio and video contents for low latency requirements.

The tools described herein can thus advantageously enable and facilitate on-site guidance with intelligence, while also enabling a shared workspace among multiple users and devices that can significantly improve work efficiency. The tools can further enable a better user experience, as looking through an augmented three-dimensional (3D) or fully immersive virtual environment is much more intuitive than conventional human-machine interactions. Offloading compute-intensive resources to edge and cloud computing platforms can further enable a "thin client" at the user side (e.g., an on-site or field engineer that is physically present and performing installation or other provisioning actions on IT assets). 5G and network slicing techniques can further enhance connectivity, throughput and stability of remote collaboration.

Conventional remote monitoring solutions are typically straightforward and utilize communication technologies such as 4G and WiFi in a centralized framework. Illustrative embodiments, in contrast, provide various improvements and additional value. With the advancement of 5G networks, edge to core to cloud strategies can be leveraged to offload compute-intensive aspects of the remote collaboration to edge and cloud computing platforms, while the end devices retain minimum functions as a "thin client." With 5G and edge computing, some embodiments can also fully explore the collaboration between cloud and edge servers to smartly offload different kinds of workloads into cloud or edge servers to make full use of their resources. This can also support the transition from a centralized management framework to a more decentralized framework that fully leverages a distributed network of edge services in 5G environments.

Remote collaboration is further enabled by leveraging key concepts in 5G, edge computing and network slicing. Edge computing, for example, may be used for local data aggregation, processing and distribution. Network slicing can be used to partition the network into multiple logical or virtual networks, allowing different types of data latency and transmission throughput for different types of data utilized in the remote collaboration (e.g., to greatly reduce latency and improve user experience for on-site and remote engineers). With the above key differentiators, some embodiments can fully integrate the latest 5G technologies to facilitate remote monitoring and collaboration with AR/VR concepts. The limitations of conventional approaches, such as high communication latency, limited bi-directional interactions, etc., are addressed to further improve user experiences (e.g., to achieve the long-term vision of metaverse technology).

Some embodiments are thus well aligned with growing trends in the IT industry as it relates to the metaverse. The new era of the metaverse has the potential to unleash amazing creativity and open up new frontiers and horizons for brands and businesses. To prepare for it, companies and other entities will need to transition strategies from physical/online to a shared virtual economy, and will need an awareness of the different culture inside the metaverse. The metaverse provides various opportunities for IT vendors, including but not limited to: being in a unique position to bring to market all the critical parts of the IT landscape to deliver the metaverse; and infrastructure providers can provide powerful laptops, servers, storage systems as well as AR/VR devices to empower the metaverse.

In some embodiments, mobile AR devices may include standalone AR headsets, AR glass, AR lens, etc. VR HMDs or web browsers (or other software) can be used to provide tools for remote engineers to visualize the on-site environment and provide guidance to field engineers. The remote engineers are thus able to move seamlessly between AR and immersive VR while collaborating on the tasks at hand.

Remote collaboration among field and remote engineers using AR and VR technology may be used in various application scenarios. As one example, consider installation of IT assets in a data center or other facility. Customers or end-users can experience significant pain or frustration during the process of hardware acquisition, planning and installation. The act of planning, designing and setting up hardware, such as Dell EMC VxRail™, can take more than 39 person-hours of an IT services team including the requirement for an on-site installation engineer which is expensive and time-consuming. Further, during installation users may not be able to identify where they are in the overall setup process, and whether past steps were successful.

Most IT infrastructure employees are not engineers or experts on all IT assets that are installed in the IT infrastructure, such that on-site support is not always an option. For example, current support models may require that: (1) faults or errors are detected and reported; (2) customers are notified, and someone is at the data center where the IT assets are located; and (2) technicians must report within specified service level agreements (SLAs). Outside of core hours, customer environments are typically managed by Tier-1 support technicians that lack the necessary skill, so Tier-2 or Tier-3 support technicians must report from home. Such Tier-2 or Tier-3 support technicians must travel within the agreed-upon SLAs, and sometimes the time to travel to and from the data center where the IT assets are located can significantly outweigh the overall diagnosis and repair times (e.g., for both the customer and the technicians).

If remote monitoring is enabled in these and other application scenarios, remote engineers (e.g., remote support technicians) can see what an on-site or field engineer sees so as to provide a live feedback loop for guided support. As such, the total lead time for problem-solving will be significantly reduced and customer satisfaction will be improved. The technical solutions described herein can provide remote monitoring and control for multiple users to work together in a fully immersive environment, which can significantly increase efficiency.

Physical, AR and immersive VR are traditionally separate media that users cannot seamlessly move between. Conventional AR and VR are normally separate applications, which are independent from one another with separate software, hardware and use cases. AR and VR technology, for example, are highly sensitive to latency. Generally, 20 millisecond (ms) Motion-to-Photon (MTP) latency is required for VR, and 5 ms MTP latency is required for AR. If such latency requirements are not met, this will cause the user to have disorientation and nausea. If the AR and VR contents are placed in edge or cloud computing platforms which are not "close" to the endpoint AR and VR devices, the latency caused by network transmission may be required to be within 70 ms round-trip time (RTT) latency. In other words, if RTT latency is above 70 ms then the user experience will be affected.

By wearing AR headsets and glasses, when a field engineer is looking at IT assets in a data center, the field engineer will see digitally produced instructional overlays. Such instructional overlays may include interactive training modules to take a user through a series of visual work prompts, as well as step-by-step instructions for guiding the field engineer to perform installation or other provisioning tasks. To get additional help, the field engineer or local support technician can connect with an off-site remote engineer or support technician to collaborate virtually. One or more 360° cameras may be installed in the field (e.g., at the data center where the IT assets are located) to provide real-time panoramic video streaming, visualized to the remote engineer in smart devices or the web. The remote engineer can see exactly what an on-site worker sees in VR using a VR headset or in a web browser or other VR software, enabling the remote engineer to provide live guided support (e.g., graphical annotations or voice assistance) in VR, AR or other smart devices. The field engineer will thus receive guidance immediately (e.g., in real-time) and perform the installation or other provisioning tasks accordingly.

Figure 3:
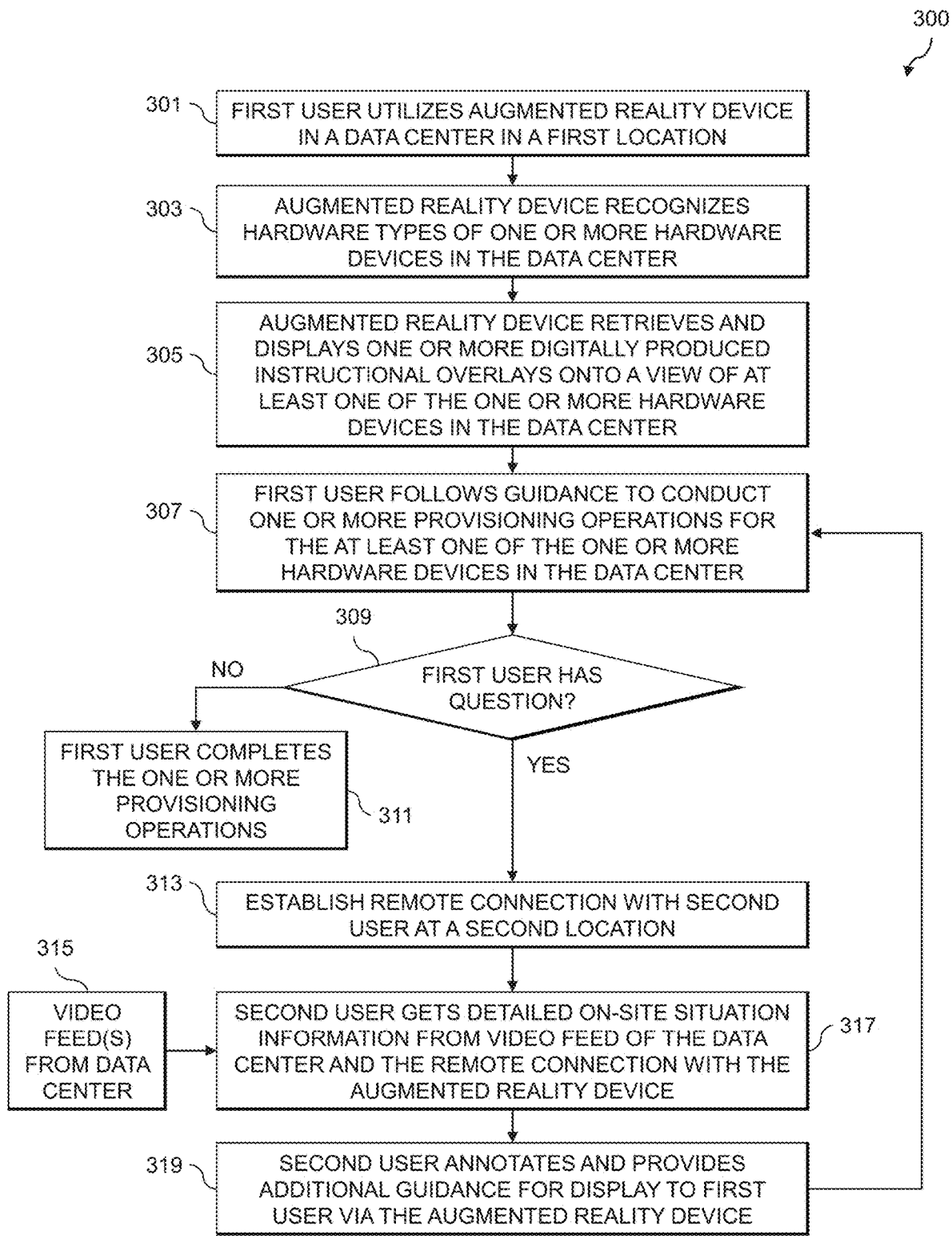
FIG. 3 shows a process flow for remote collaboration of augmented reality and virtual reality computing environments at different computing sites in an illustrative embodiment.

FIG. 3 shows a process flow 300 for remote collaboration of AR and VR computing environments at different computing sites. In this embodiments, it is assumed that a first user (e.g., an on-site or field engineer) utilizes AR devices while a second user (e.g., a remote engineer) utilizes VR devices. It should be appreciated, however, that in other embodiments the first user may utilize VR devices in addition to or in place of AR devices, the second user may utilize AR devices in addition to or in place of AR devices, or both the first and second users may utilize AR and VR devices. The process flow 300 begins in step 301 with the first user (e.g., an on-site or field engineer) utilizing an AR device (e.g., AR glass) in a data center in a first location. In step 303, the AR device recognizes types of the IT assets that are in the data center at the first location (e.g., hardware types of one or more hardware devices in the data center). The AR device in step 305 retrieves and displays one or more digitally-produced instructional overlays onto a view of the IT assets in the data center. In step 307, the first user follows the guidance to conduct one or more provisioning operations (e.g., for installation, configuration, troubleshooting, etc.) for one or more of the IT assets in the data center.

In step 309, a determination is made as to whether the first user (e.g., the on-site or field engineer) has one or more questions or otherwise needs assistance in conducting the one or more provisioning operations. If the result of the step 309 determination is no, the first user completes the one or more provisioning operations in step 311. If the result of the step 309 determination is yes, the process flow 300 proceeds to step 313. In step 313, the first user (e.g., via associated AR devices or other devices of the first user, such as one or more smartphones) establishes a remote connection with the second user (e.g., a remote engineer) at a second location. It should be noted that remote connections may be established with multiple additional users if needed or desired. The second user is supplied with one or more video feeds (e.g., 360° panoramic video feeds) from the data center in step 315. The second user in step 317 gets detailed on-site situation information from the one or more video feeds of the data center and the remote connection with the first user (e.g., that user's AR or other devices). In step 319, the second user annotates and provides additional guidance for display to the first user via the first user's associated AR devices. The process flow 300 then returns to step 307.

Figure 4:
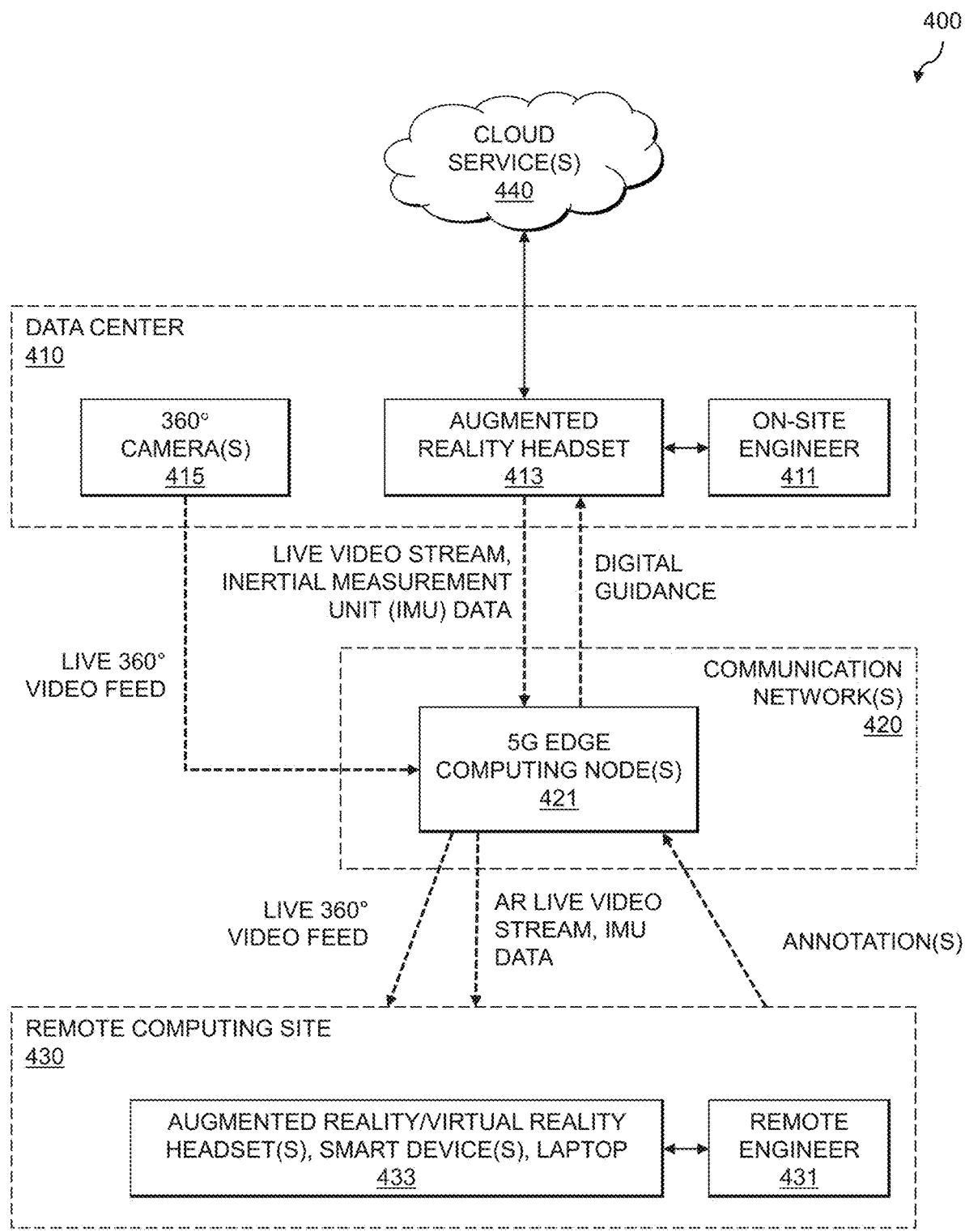
FIG. 4 shows communication of data between computing sites for facilitating remote collaboration of augmented reality and virtual reality computing environments in an illustrative embodiment.

FIG. 4 shows communication of data between computing sites in a system 400 for facilitating remote collaboration of AR and VR computing environments. In the FIG. 4 example, it is assumed that an on-site engineer 411 utilizes one or more AR devices and that a remote engineer 431 utilizes one or more VR devices. In other embodiments, however, the on-site engineer 411 may also or alternatively utilize one or more VR devices and/or the remote engineer 431 may also or alternatively utilize one or more AR devices. The system 400 includes a data center 410, communication networks 420, a remote computing site 430 and one or more cloud services 440. The data center 410 includes the on-site engineer 411 that is associated with one or more AR devices, shown in FIG. 4 as an AR headset 413. The data center 410 also includes one or more 360° cameras 415. The 360° cameras 415 provide live video feeds (e.g., 360° video) to 5G edge computing nodes 421 in the communication networks 420 for processing. The AR headset 413 provides a live video stream (e.g., what the on-site engineer "sees") as well as inertial measurement unit (IMU) data to the 5G edge computing nodes 421 of the communication networks 420. The communication networks 420, including the 5G edge computing nodes 421, may implement various applications (e.g., for Unity application initialization, for 3D information data storage, etc.). The 5G edge computing nodes 421 of the communication networks 420 provide the live 360° video feed and AR live video stream and IMU data to the remote computing site 430 (e.g., possibly using different network slices). The remote engineer 431 at the remote computing site 430 can utilize one or more AR/VR headsets, smart devices, a laptop, etc. 433 to analyze the live 360° video feed and AR live video stream and IMU data to generate one or more annotations that are provided back to the communication networks 420, and then to the on-site engineer 411 via the AR headset 413 (e.g., as a live video stream with the annotations).

Remote collaboration applications, also referred to as virtual presence, can more closely resemble an in-person meeting than something like a video chat or a conference call. There are various applications for remote collaboration which can be utilized with compatible AR headsets. The tools described herein can advantageously combine VR and AR together for remote collaboration. An on-site engineer can receive guidance from an AR device, while a remote engineer can give guidance in AR, a smart device, an immersive VR environment, combinations thereof, etc., depending on the devices at hand. Some embodiments can also provide technical solutions that utilize edge, core and cloud computing platforms to facilitate remote collaboration utilizing AR and VR computing environments.

With AR technology, guidance for field engineers will become easier and hands-free. A field engineer (e.g., a user) can wear the AR glasses or other AR devices, and when they operate the AR devices the field engineer can get direct instructions on the AR devices without the need to stop their work. In order to make this more intelligent, audio and video analytic approaches can be leveraged (e.g., to understand voice commands, hand or other movement gestures, etc.). With this information, the field engineer can interact with the AR devices and receive guidance information on demand for certain situations and problems faced during real-time provisioning operations (e.g., installation, configuration, maintenance, troubleshooting, etc.).

In addition to benefits for intelligent guidance strategies for on-site engineers, remote engineers can also perform remote collaboration with on-site engineers using AR and VR technology. Remote engineers can use different kinds of AR and VR devices (e.g., helmets, glasses, event web VR technologies, etc.) to be virtually "in the same room" with on-site engineers. The remote engineers can also leverage sensors installed in the on-site environment, or on the AR devices of the on-site engineers to sense the on-site environment and operations of the on-site engineers. In this way, the technical solutions described herein can help to provide instructions for on-site engineers when the remote engineers analyze information from the on-site environment or the on-site engineers' operations. In summary, with AR and VR technologies, the guidance and remote collaboration become much more intuitive and seamlessly integrated for both the on-site and remote teams, bringing new value for remote collaboration operations.

The technical solutions described herein can leverage an edge-core-cloud IT architecture for data processing. The cloud and edge layers may be used to store and organize the information, and to transmit the information in real-time and in a visual way through AR devices. The edge layer will be able to conduct sensor fusing, data processing, large 3D model rendering, etc. At the terminal side (e.g., the AR devices associated with field engineers), the AR devices support AR tracking and light model rendering to give a uniform user experience. With this edge to core to cloud strategy, lightweight client functions in the terminal (e.g., AR devices associated with the field engineers, or other devices of the field engineers such as a smartphone) provide a minimum set of capabilities that need to be present for rendering the AR experience.

To support remote collaboration, some embodiments leverage key advantages of 5G communication technologies, including edge computing and network slicing. As discussed above, edge computing at the edge layer may be used to process data locally close to the end-users (e.g., the field engineers). The sensor data can be aggregated on the edge side, and then processed to interact with the on-site and remote engineers. Network slicing may be used to achieve a sliced network, which transforms the network into a set of logical networks on top of a shared infrastructure. Each logical network is designed to serve a defined business purpose or use case, and comprises all of the required network resources for that use case. In some embodiments, different logical networks are designed for low latency interactions and high-speed transmission (e.g., of live streaming 360° video feeds).

In some embodiments, network slicing is leveraged to create two slices for the data transmission between on-site and remotely collaborating engineers. A first network slice is designed for low latency. When the on-site engineer talks with the remote engineers to discuss issues and get instructions, the first network slice will support low latency to support both the on-site and remote engineers to have smooth audio communications. A second network slice is designed for high data throughput. For the remote sensor data and instructions in video or audio formats, this data will be sent between remote and on-site engineers. This kind of data is generally very large in size. The second network slice is created to have high data throughput to ensure high-speed transmission, which can also reduce latency for both on-site and remote engineers to have better user experiences to interact with AR and VR content.

In some embodiments, a 360° panoramic view of the environment (e.g., where the on-site or field engineer is performing provisioning actions on IT assets in a data center or other facility) is used for remote collaboration. The 360° panoramic view (e.g., image or video) can be leveraged in VR computing environments for development. One or more 360° cameras are used to create the 360° panoramic images or videos for real scenes in life. The panoramic contents can be automatically generated without manual stitching using various tools, including but not limited to Insta360® GO 2, GoPro Fusion®, Ricoh® Theta V, Garmin VIRB® Ultra 360, etc. Manual image or video stitching captured by multiple cameras (e.g., non-360° cameras) may be used to create 360° panoramic images or videos, using tools such as Kolor Autopano, PTGui®, Adobe Photoshop®, etc.

Remote collaboration may further include 3D content creation for AR and VR computing environments. The 3D environment for supporting remote collaboration may be implemented using various tools, such as 3D game engines including Unity 3D, Unreal Engine® 4, etc., open source VR development tools including OSVR®, JanusXR, OpenSpace3D®, etc. VR development tools such as Amazon Sumerian®, CryENGINE®, Blender®, Autodesk 3ds MAX®, SketchUp Studio, Autodesk Maya®, etc. may also be used. Different AR and VR devices may also have their own software development kits (SDKs) which may be used. Various VR applications for meeting, training and remote collaboration in virtual spaces may also be leveraged, including EngageVR®, AltspaceVR®, Acadicus, Rumii, Future Visual VISIONxR™, Immersed, Hubs by Mozilla®, Glue Platform, Connec2, MeetinVR, etc. These and other applications may have virtual spaces developed with virtual avatars, where the virtual avatars can interact with each other using video conferences, playing games, hosting conferences, teaching classes, showcasing art, sharing presentations, playing together with 3D objects, watching movies together, etc. Some VR applications are web-based, while others can only be loaded on specific VR hardware (e.g., specific VR HMDs). VR applications may be commercial or open source.

Figure 5:
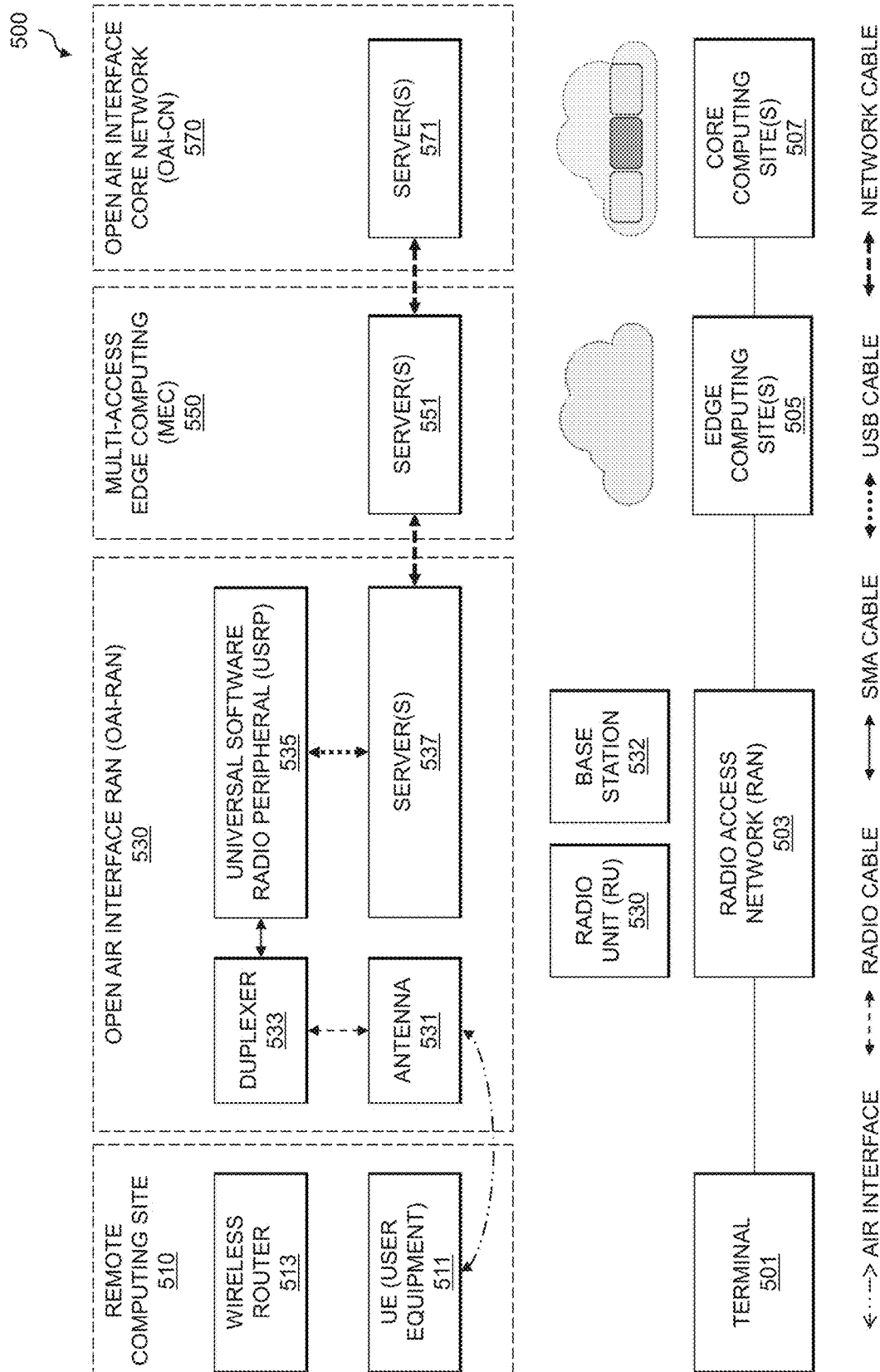
FIG. 5 shows a system implementation for facilitating remote collaboration of augmented reality and virtual reality computing environments in an illustrative embodiment.

Remote collaboration is further facilitated utilizing 5G multi-access edge computing (MEC) management parts, with cloud coordination. Open source edge management platforms may be leveraged for resource coordination and content management. FIG. 5 shows a system implementation 500 for facilitating remote collaboration of AR and VR computing environments. The system implementation 500 shows the components for a minimal 5G/MEC environment, including a terminal 501, a radio access network (RAN) 503, one or more edge computing sites 505, and one or more core computing sites 507. The terminal 501 is at a remote computing site 510, and includes user equipment (UE) 511, such as a smartphone, and one or more wireless routers 513. The RAN 503 includes a radio unit (RU) 532 and one or more base stations 534 (e.g., gNB/eNB), implementing an open air interface RAN (OAI-RAN) 530. The OAI-RAN 530 includes an antenna 531, a duplexer 533, a universal software radio peripheral (USRP) 535, and one or more servers 537 (e.g., Dell OptiPlex® 7050 servers). The edge computing sites 505 implement MEC 550 with one or more servers 551 (e.g., Dell PowerEdge® R440 servers). The core computing sites 507 implement an open air interface core network (OAI-CN) 570 with one or more servers 571 (e.g., Dell PowerEdge® R640 servers). The UE 511 and antenna 531 are connected over an air interface. The antenna 531 and duplexer 533 are connected via a radio cable. The duplexer 533 and USRP 535 are connected via a SubMiniature version A (SMA) cable. The USRP 535 and servers 537 are connected via a Universal Serial Bus (USB) cable (e.g., a USB-C or USB 3.0 cable). The servers 537, 551 and 571 are connected via network cables.

Various edge platforms may be used for edge management, including but not limited to Akraino® Edge Stack. Akraino® Edge Stack provides a set of open infrastructures and application blueprints for edge computing, spanning a broad variety of use cases, including 5G, artificial intelligence (AI), Edge IaaS/PaaS, IoT, etc., for both provider and enterprise edge domains. The Akraino® Edge Stack has six blueprint families and fourteen blueprints. One of them is IEC Type 4: AR/VR-oriented Edge Stack, focused on AR/VR applications running on the edge. This blueprint builds an AR/VR infrastructure and introduces a virtual classroom application, which improves online education experiences for teachers and students through a virtual classroom simulation. With this edge management platform, some embodiments build an AR/VR content management and distribution system.

Figure 6:
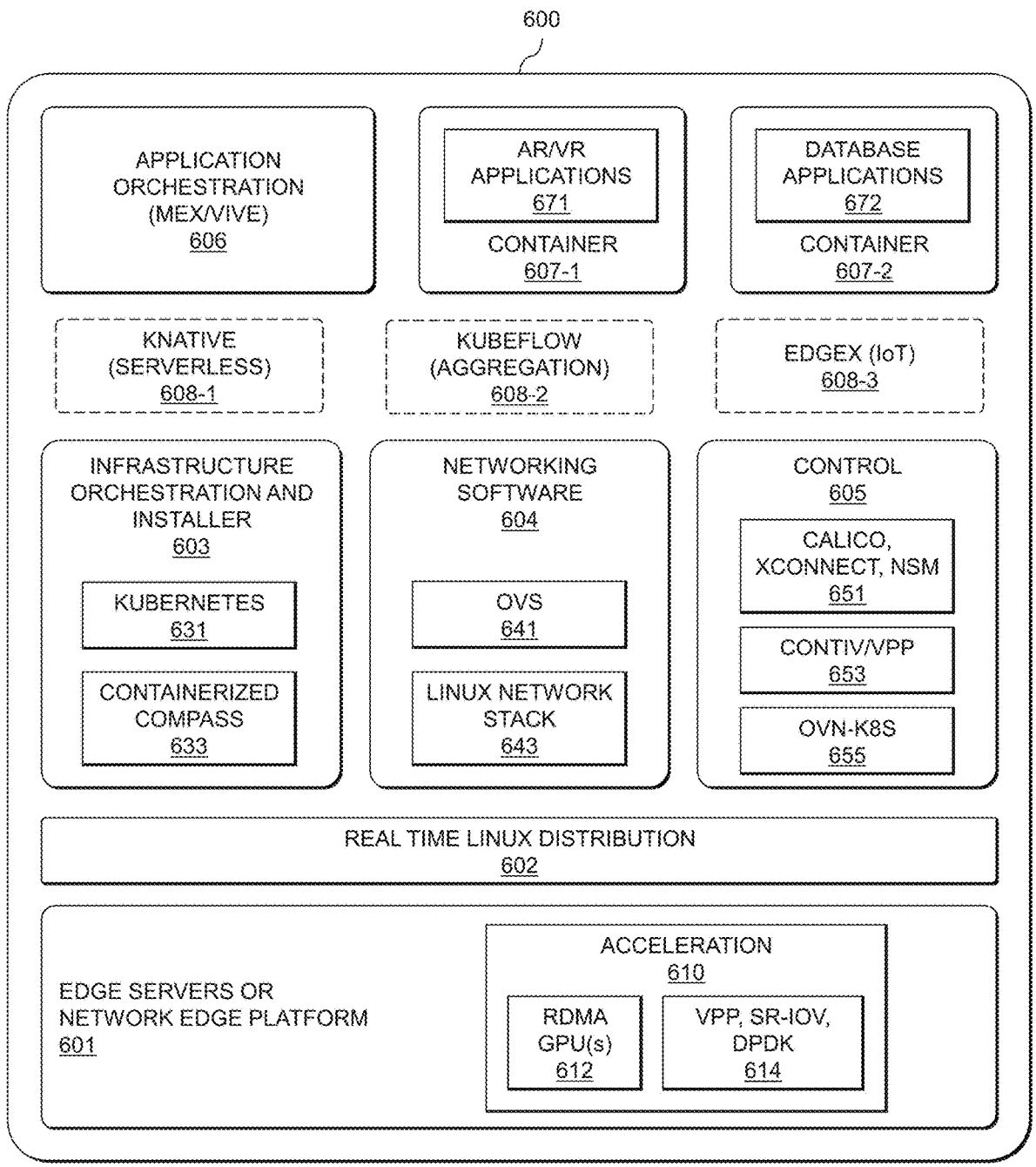
FIG. 6 shows a software stack of services utilized for orchestrating remote collaboration of augmented reality and virtual reality computing environments in an illustrative embodiment.

FIG. 6 shows a software stack 600 of services utilized for orchestrating remote collaboration of AR and VR computing environments. The software stack 600 includes edge servers or a network edge platform 601, which includes acceleration technology 610 such as remote direct memory access (RDMA) graphical processing units (GPUs) 612 and Vector Packet Processing (VPP), Single Root I/O Virtualization (SR-IOV), and Data Plane Development Kit (DPDK) 614. The edge servers or network edge platform 601 run a real time Linux distribution 602, on which infrastructure orchestration and installer software 603, network software 604 and control software 605 run. The infrastructure orchestration and installer software 603 may include, for example, Kubernetes® 631, Containerized Compass 633, etc. The network software 604 may include, for example, Open vSwitch (OVS) 641, a Linux network stack 643, etc. The control software 605 may include, for example, Calico, xConnect, Network and Security Manager (NSM) 651, Contiv-VPP 653, Open Virtual Network Kubernetes (OVN-K8S) 655, etc. Application orchestration (Distributed Application Mobility Architecture (MEX)/Cloud VR Vertical Deployment Architecture (VIVE)) 606 is used to implement containers 607-1 and 607-2. The container 607-1 implements AR/VR applications 671, and the container 607-2 implements database applications 672. The containers 607-1 and 607-2, as well as other software in the software stack 600, may be supported utilizing Knative serverless workloads 608-1, Kubeflow aggregation 608-2, and EdgeX IoT 608-3.

Figure 7:
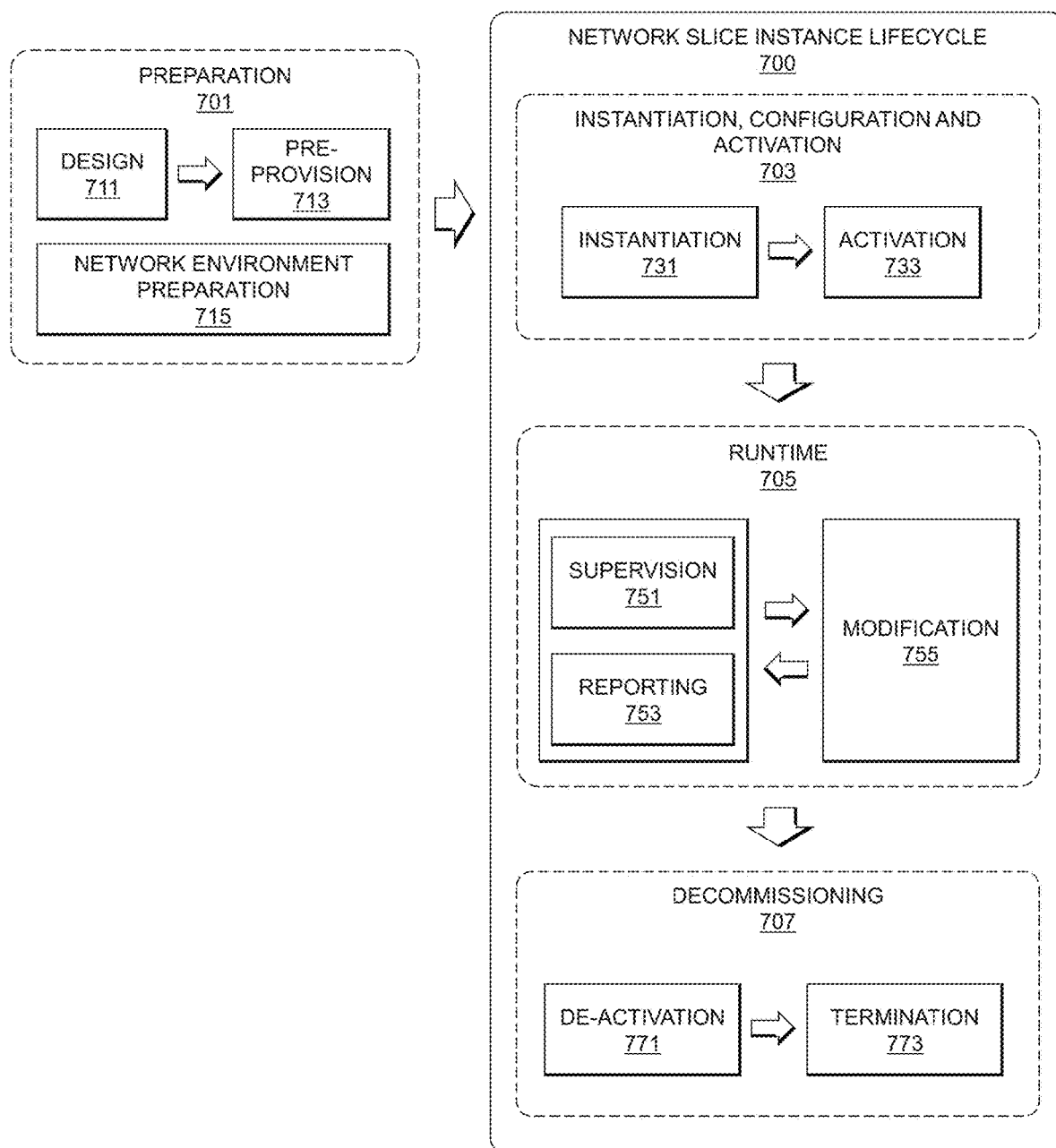
FIG. 7 shows a lifecycle of network slicing technology utilized in facilitating remote collaboration of augmented reality and virtual reality computing environments in an illustrative embodiment.

As noted above, network slicing is another 5G technology that is leveraged in some embodiments. Network slicing involves the instantiation and operation of multiple parallel logical networks operated within a single physical network. Network slices can be created for serving specific use cases, and each slice can be viewed as a "service" with its own specific requirements in terms of bandwidth, quality of service (QoS), latency, security, etc. Each network slice with an operator network has an associated lifecyle. FIG. 7 illustrates a network slice instance lifecycle 700, which includes preparation 701, instantiation, configuration and activation 703, runtime 705, and decommissioning 707. Preparation 701 includes design 711, pre-provisioning 713 and network environment preparation 715. Instantiation, configuration and activation 703 includes instantiation 731 and activation 733 of the network environment for the network slice. Runtime 705 includes supervision 751, reporting 753 and modification 755 of the network environment for the network slice. Decommissioning 707 includes de-activation 771 and termination 773 of the network slice.

Illustrative embodiments provide a number of advantages, including through implementation of a novel framework for remote collaboration leveraging AR, VR and 5G technologies. The system frameworks described herein integrate such technologies to achieve more intuitive remote collaboration, which can provide seamless interaction for on-site and remote engineers. The technical solutions described herein also provide an edge-core-cloud architecture, where edge to core to cloud strategies are leveraged to offload compute-intensive aspects to edge and cloud computing platforms, while endpoint devices remain the same within minimum functions (e.g., as "thin clients").

The technical solutions described herein also advantageously utilize network slicing and edge computing for remote collaboration. Edge computing may be used to support local data aggregation, processing and distribution. Network slicing is used to partition the network into multiple virtual networks allowing different types of data latency and transmission throughput, to greatly reduce latency and improve user experience for on-site and remote engineers. Conventional approaches rely on 4G and WiFi communication technologies in a centralized framework. The technical solutions described herein, in contrast, enable offload of compute-intensive aspects to edge and cloud computing platforms while maintaining endpoint devices as thin clients. 5G and edge computing are also leveraged to fully explore the collaboration between cloud and edge servers, and to smartly offload different kinds of workloads into cloud or edge servers to make full use of their resources. This can also support the transition from a centralized management framework to a more decentralized framework to more fully leverage the distributed network of edge servers in 5G environments Further, 5G, edge computing and network slicing are leveraged for remote collaboration. Network slicing technology is used to partition the network into multiple virtual networks allowing different types of data latency and transmission throughput, so as to greatly reduce latency and improve user experience for on-site and remote engineers. With such key differentiators, illustrative embodiments can fully integrate the latest 5G technologies for remote monitoring with AR and VR concepts, thereby overcoming technical problems of conventional approaches including high communication latency and limited bi-directional interactions (e.g., between on-site and remote engineers).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for remote collaboration between users utilizing AR and VR computing devices will now be described in greater detail with reference to FIGS. 8 and 9. Although described in the context of system 100, these platforms may also be used to implement at least portions of other information processing systems in other embodiments.

Figure 8:
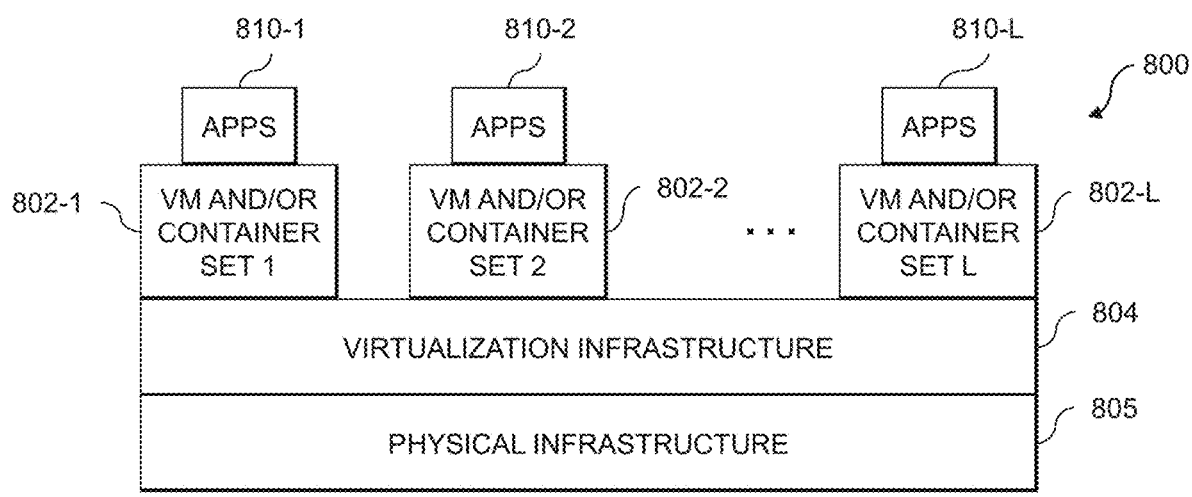
FIGS. 8 and 9 show examples of processing platforms that may be utilized to implement at least a portion of an information processing system in illustrative embodiments.
Figure 9:
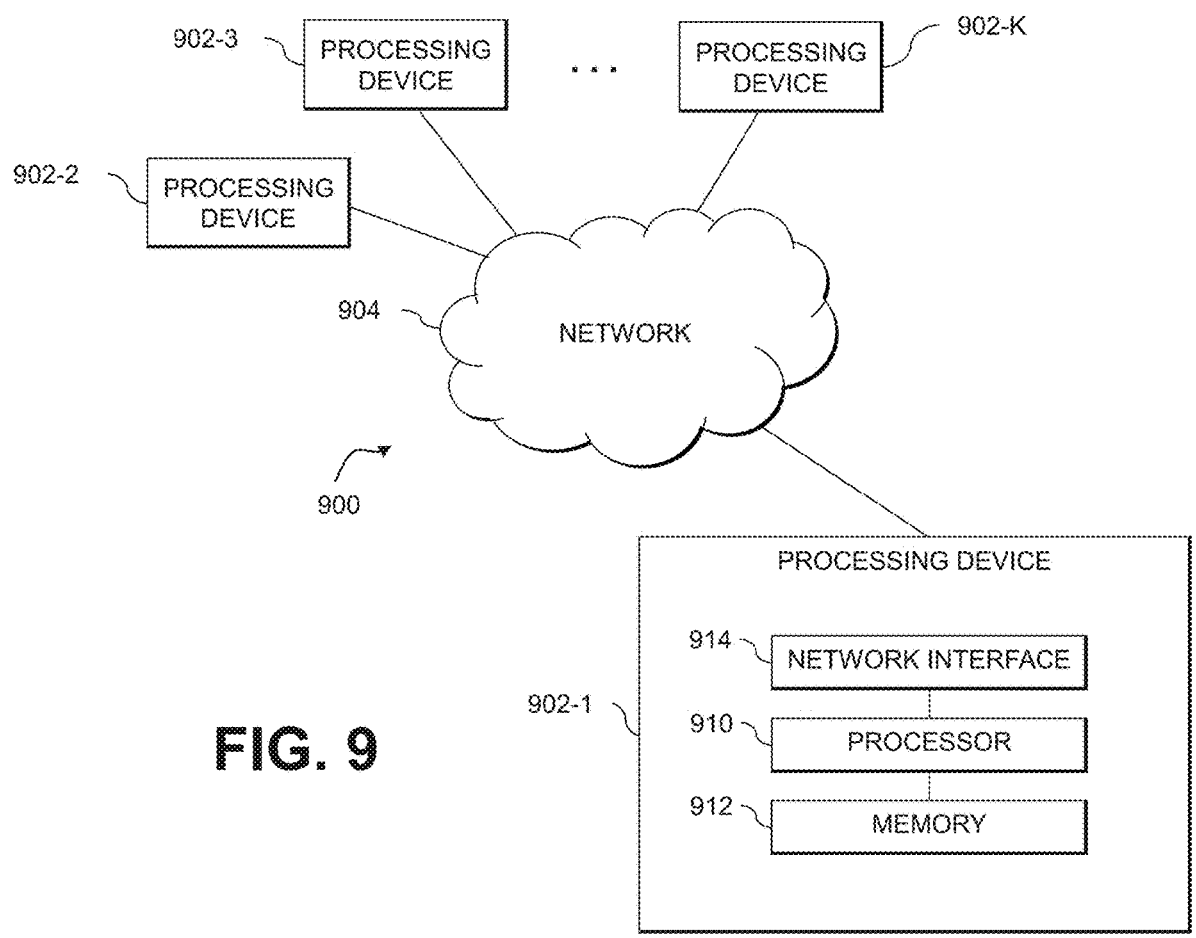

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for remote collaboration between users utilizing AR and VR computing devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, AR devices, VR devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   establishing, utilizing one or more communication networks, a remote collaboration session between at least a first computing device associated with a first user at a first location and at least a second computing device associated with a second user at a second location different than the first location, wherein each of the first computing device and the second computing device comprises at least one of an augmented reality computing device and a virtual reality computing device;
   determining two or more different types of data to be exchanged between the first computing device and the second computing device as part of the remote collaboration session, the two or more different types of data to be exchanged between the first computing device and the second computing device as part of the remote collaboration session comprising (i) at least one live video stream and (ii) digital guidance to be overlayed on at least a portion of the at least one live video stream, the digital guidance specifying one or more provisioning actions to be performed on one or more information technology assets at the first location;
   generating two or more different logical network slices of the one or more communication networks, the two or more different logical network slices of the one or more communication networks comprising at least a first logical network slice having a first set of network characteristics for the at least one live video stream and at least a second logical network slice having a second set of network characteristics for the digital guidance to be overlayed on at least a portion of the at least one live video stream, the second set of network characteristics being different than the first set of network characteristics; and
   communicating the two or more different types of data between the first computing device and the second computing device utilizing respective ones of the two or more different logical network slices of the one or more communication networks.

2. The apparatus of claim 1 wherein the at least one video stream comprises a first live video stream from the first computing device and at least a second live video stream from one or more video cameras at the first location.

3. The apparatus of claim 2 wherein the first logical network slice is utilized for the first live video stream and the second live video stream.

4. The apparatus of claim 2 wherein the first computing device comprises at least one augmented reality computing device, and wherein the first live video stream further comprises inertial measurement unit data from the at least one augmented reality computing device.

5. The apparatus of claim 2 wherein the second live video stream comprises a 360 degree panoramic view of the one or more information technology assets at the first location from one or more 360 degree panoramic video cameras at the first location.

6. The apparatus of claim 2 wherein the second live video stream comprises a 360 degree panoramic view of the one or more information technology assets at the first location that is stitched together from two or more non-360 degree panoramic video cameras at the first location.

7. The apparatus of claim 1 wherein the first set of network characteristics of the first logical network slice comprises a first data throughput level and a first latency, wherein the second set of network characteristics of the second logical network slice comprises a second data throughput level and a second latency, wherein the second data throughput level is lower than the first data throughput level, and wherein the second latency is lower than the first latency.

8. The apparatus of claim 1 wherein the digital guidance specifying the one or more provisioning actions to be performed on the one or more information technology assets at the first location comprises at least one audio stream for audio communications between the first user and the second user.

9. The apparatus of claim 1 wherein the first computing device comprises at least one augmented reality computing device, and wherein the digital guidance specifying the one or more provisioning actions to be performed on the one or more information technology assets at the first location comprises one or more annotations for digital overlay via the at least one augmented reality computing device.

10. The apparatus of claim 1 wherein the one or more communication networks comprise a 5G communication network.

11. The apparatus of claim 1 wherein the at least one processing device is further configured to perform the step of processing at least one of the two or more different types of data to be exchanged between the first computing device and the second computing device as part of the remote collaboration session utilizing one or more edge computing nodes of the one or more communication networks.

12. The apparatus of claim 11 wherein preprocessing said at least one of the two or more different types of data to be exchanged between the first computing device and the second computing device as part of the remote collaboration session utilizing one or more edge computing nodes of the one or more communication networks comprises at least one of pose estimation of the first user, object tracking of one or more information technology assets at the first location, and object recognition of the one or more information technology assets at the first location.

13. The apparatus of claim 1 wherein the first computing device comprises at least one augmented reality computing device, wherein the second computing device comprises at least one virtual reality computing device, wherein the at least one augmented reality computing device comprises at least one of augmented reality glasses and augmented reality lenses, and wherein the at least one virtual reality computing device comprises a head-mounted display.

14. The apparatus of claim 1 wherein the first user is associated with a first enterprise operating a data center at the first location, and wherein the second user is associated with a second enterprise providing support services to the first enterprise.

15. A computer program product comprising a non-transitory processor-readable storage medium having stored therein program code of one or more software programs, wherein the program code when executed by at least one processing device causes the at least one processing device to perform steps of:

establishing, utilizing one or more communication networks, a remote collaboration session between at least a first computing device associated with a first user at a first location and at least a second computing device associated with a second user at a second location different than the first location, wherein each of the first computing device and the second computing device comprises at least one of an augmented reality computing device and a virtual reality computing device;

determining two or more different types of data to be exchanged between the first computing device and the second computing device as part of the remote collaboration session, the two or more different types of data to be exchanged between the first computing device and the second computing device as part of the remote collaboration session comprising (i) at least one live video stream and (ii) digital guidance to be overlayed on at least a portion of the at least one live video stream, the digital guidance specifying one or more provisioning actions to be performed on one or more information technology assets at the first location;

generating two or more different logical network slices of the one or more communication networks, the two or more different logical network slices of the one or more communication networks comprising at least a first logical network slice having a first set of network characteristics for the at least one live video stream and at least a second logical network slice having a second set of network characteristics for the digital guidance to be overlayed on at least a portion of the at least one live video stream, the second set of network characteristics being different than the first set of network characteristics; and communicating the two or more different types of data between the first computing device and the second computing device utilizing respective ones of the two or more different logical network slices of the one or more communication networks.

16. The computer program product of claim 15 wherein the at least one video stream comprises a first live video stream from the first computing device and at least a second live video stream from one or more video cameras at the first location.

17. The computer program product of claim 15 wherein:
the first set of network characteristics of the first logical network slice comprises a first data throughput level and a first latency;
the second set of network characteristics of the second logical network slice comprise a second data throughput level and a second latency;
the second data throughput level is lower than the first data throughput level; and
the second latency is lower than the first latency.

18. A method comprising:
establishing, utilizing one or more communication networks, a remote collaboration session between at least a first computing device associated with a first user at a first location and at least a second computing device associated with a second user at a second location different than the first location, wherein each of the first computing device and the second computing device comprises at least one of an augmented reality computing device and a virtual reality computing device;
determining two or more different types of data to be exchanged between the first computing device and the second computing device as part of the remote collaboration session, the two or more different types of data to be exchanged between the first computing device and the second computing device as part of the remote collaboration session comprising (i) at least one live video stream and (ii) digital guidance to be overlayed on at least a portion of the at least one live video stream, the digital guidance specifying one or more provisioning actions to be performed on one or more information technology assets at the first location;
generating two or more different logical network slices of the one or more communication networks, the two or more different logical network slices of the one or more communication networks comprising at least a first logical network slice having a first set of network characteristics for the at least one live video stream and at least a second logical network slice having a second set of network characteristics for the digital guidance to be overlayed on at least a portion of the at least one live video stream, the second set of network characteristics being different than the first set of network characteristics; and
communicating the two or more different types of data between the first computing device and the second computing device utilizing respective ones of the two or more different logical network slices of the one or more communication networks;
wherein the method is performed by at least one processing device comprising a processor coupled to a memory.

19. The method of claim 18 wherein the at least one video stream comprises a first live video stream from the first computing device and at least a second live video stream from one or more video cameras at the first location.

20. The method of claim 18 wherein:
the first set of network characteristics of the first logical network slice comprises a first data throughput level and a first latency;
the second set of network characteristics of the second logical network slice comprise a second data throughput level and a second latency;
the second data throughput level is lower than the first data throughput level; and
the second latency is lower than the first latency.

* * * * *